(12) United States Patent
Murphy (10) Patent No.: US 7,191,329 B2
(45) Date of Patent: *Mar. 13, 2007

(54) AUTOMATED RESOURCE MANAGEMENT USING PERCEPTRON PREDICTION

(75) Inventor: Richard C. Murphy, Mishawaka, IN (US)

(73) Assignee: Sun Microsystems, Inc., Santa Clara, CA (US)

( * ) Notice: Subject to any disclaimer, the term of this patent is extended or adjusted under 35 U.S.C. 154(b) by 593 days.

This patent is subject to a terminal disclaimer.

(21) Appl. No.: 10/382,723

(22) Filed: Mar. 5, 2003

(65) Prior Publication Data

US 2004/0177245 A1   Sep. 9, 2004

(51) Int. Cl.
*G06F 1/24* (2006.01)

(52) U.S. Cl. .............. 713/100; 709/104; 709/226; 706/25; 712/29; 718/104

(58) Field of Classification Search .............. 713/100
See application file for complete search history.

(56) References Cited

U.S. PATENT DOCUMENTS

| | | | | |
|---|---|---|---|---|
| 6,154,787 | A * | 11/2000 | Urevig et al. .................. 710/8 |
| 6,587,938 | B1 * | 7/2003 | Eilert et al. ................... 712/29 |
| 6,681,242 | B1 * | 1/2004 | Kumar et al. ............... 718/104 |
| 2002/0087734 | A1 | 7/2002 | Marshall | |
| 2002/0120774 | A1 | 8/2002 | Chellis | |
| 2002/0133757 | A1 | 9/2002 | Bertram | |
| 2003/0046396 | A1 * | 3/2003 | Richter et al. .............. 709/226 |
| 2003/0061262 | A1 * | 3/2003 | Hahn et al. ................. 709/104 |
| 2003/0216951 | A1 * | 11/2003 | Ginis et al. ..................... 705/8 |
| 2004/0059695 | A1 * | 3/2004 | Xiao et al. .................... 706/25 |
| 2005/0071470 | A1 * | 3/2005 | O'Brien et al. ............. 709/226 |

OTHER PUBLICATIONS

Anonymous: "System Management Services (SMS) 1.3 Administrator Guide" Sun Microsystems, Inc.; Part No. 816-5318-10; pp. I, 1-5, 48-50, 57-71; Jan. 2003.
Anonymous: "Sun Fire 15K/12K Dynamic Reconfiguration (DR) User Guide" Sun Microsystems, Inc.; Part No. 816-5075-12; pp. i-x, 1-48; Jan. 2003.
PCT International Search Report for International Application No. PCT/US2004/006452, 4 pages.
Written Opinion of the International Searching Authority for International Application No. PCT/US2004/006452, 9 pages.

* cited by examiner

*Primary Examiner*—Rehana Perveen
*Assistant Examiner*—Fahmida Rahman
(74) *Attorney, Agent, or Firm*—Park, Vaughan & Fleming LLP (57) ABSTRACT

A system and method for automatically identifying a desirable reconfiguration of computer system resources, using a perceptron to determine whether one resource configuration will likely be more efficient or more effective than a second configuration. An iterative solver identifies possible configurations or reconfigurations of the resources. A possible configuration is applied to the perceptron, which determines whether the new configuration is more attractive than an existing or baseline configuration, in terms of a predetermined objective function (e.g., cost, performance, resource utilization, throughput). If the new configuration improves the objective function, the new configuration may be automatically or manually applied through a dynamic reconfiguration operation.

22 Claims, 9 Drawing Sheets

AUTOMATED RESOURCE MANAGEMENT USING PERCEPTRON PREDICTION

BACKGROUND

This invention relates to the field of computer systems. More particularly, a system and methods are provided for using a multi-layer perceptron or recursive network combined with an iterative graph partitioner to facilitate the automated selection of an improved configuration of computer resources to be achieved via dynamic reconfiguration.

Dynamic reconfiguration involves the dynamic allocation, reallocation or deallocation of computer system resources such as processors, memory, storage devices and so on. If done in an efficient and intelligent manner, dynamic reconfiguration can be used to arrange or re-arrange resources to meet the shifting demands of software executing on the system, and thereby promote more efficient use of the system resources.

However, dynamically reconfiguring a resource generally requires removing it from a current domain or set of resources that are providing one service, or working on one task, and adding it to a different domain. In order to remove the resource from a domain, all dependencies involving that resource must be identified and resolved. Most systems (e.g., some UNIX platforms) do not provide means for readily mapping a resource from its underlying physical device upward through all logical constructs built upon the device, or vice versa, and therefore make it difficult to identify such dependencies. In particular, protocol-based methods of determining resource dependencies do not track dependencies as they evolve, and thus do not allow accurate prediction of whether a desired dynamic reconfiguration operation is likely to succeed.

Instead, existing methods of dynamic reconfiguration require a reconfiguration operation to be attempted before its chance of success can be determined. In addition, some systems only allow for the reallocation or reassignment of virtual or logical resources, not physical resources.

Thus, when a dynamic reconfiguration of a particular resource is desired, protocol calls may be made to the resource's configuration software or device driver. Calls may also be made to various other configuration agents to determine whether they have any dependencies with the resource. A series of recursive calls may have to be made to trace chains of dependencies. After dependent devices are identified, the dynamic reconfiguration is attempted, with little predictability, if any, as to its success.

While attempting to determine the resource's dependencies, or attempting the actual reconfiguration, those dependencies may be changing (e.g., new dependencies may be added). Or, a device may refuse to release the resource when requested. As a result, the reconfiguration may fail because the resource has not been freed from all dependencies.

In addition, current methods of identifying and attempting dynamic resource reconfigurations are manual. The efficiency of selecting and implementing a dynamic reconfiguration could be improved by making the process automatic. In particular, it would be desirable for a system of resources to autonomously identify a better configuration or allocation scheme for its resources, and then perform a dynamic reconfiguration to attain that configuration. Such a system might periodically or continually search for better configurations.

However, identifying a configuration that is "better" than another (e.g., current) configuration can be difficult. Existing systems designed to identify a desirable reconfiguration of resources usually employ mathematical models. Such models are often flawed, particularly in their inability to accurately determine whether the performance of one configuration of resources would provide better performance than another configuration. Further, such models may be unable to identify a configuration that not only provided increased performance, but which also satisfies a set of constraints on system resources.

Thus, there is a need for a system and method for identifying a desirable reconfiguration of a set of resources, wherein the resources as reconfigured would dependably yield better system performance (e.g., in terms of some objective function) and would not violate any system constraints.

SUMMARY

In one embodiment of the invention, a system and method are provided for automatically identifying a desirable reconfiguration of computer system resources. A perceptron is used to determine whether one resource configuration will likely be more efficient or effective than a second configuration. An iterative solver identifies possible configurations or reconfigurations of the resources. A possible configuration is applied to the perceptron, which determines whether the new configuration is more attractive than an existing or baseline configuration, in terms of a predetermined objective function (e.g., cost, performance, resource utilization, throughput) and, how much more attractive. If the new configuration improves the objective function, the new configuration may be automatically or manually applied through a dynamic reconfiguration operation.

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a platform or collection of system resources that can be dynamically configured or allocated within or among domains or sets of resources. Details of such devices (e.g., processor, memory, data storage, communication interface, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory.

Introduction

In one embodiment of the invention, a system and method are provided for facilitating dynamic reconfiguration of computer system resources (e.g., processors, memory, storage, communication interfaces) while tracking resource dependencies with a resource dependency graph. In one implementation of this embodiment, by referring to the graph the success or failure of a particular reconfiguration operation can be predicted prior to attempting the operation.

In another embodiment of the invention, a system and method are provided for facilitating the identification or selection of a dynamic reconfiguration operation. In this embodiment, a perceptron is employed to help identify advantageous reconfigurations of system resources, as measured by some objective function (e.g., cost, performance). Thus, by feeding the perceptron possible configurations or reconfigurations of resources, the perceptron will indicate which configurations, if any, will improve the objective function (e.g., lower the overall cost of operating the resources, increase the performance of the system).

In one embodiment, the dependency graph is a directed acyclic graph. The graph may be directed from underlying physical devices upward through all logical constructs built upon the physical device, or may be directed from higher logical constructs toward underlying physical devices.

As physical devices are initialized, device drivers loaded, and logical devices constructed and mounted, software modules responsible for such actions may build and amend the graph as necessary to reflect the actions, or call a graph management agent to modify the graph. Thus, each dependency may be added to the graph as it arises. Similarly, as dependencies are removed (e.g., because a device is removed or reconfigured), the graph is updated accordingly.

In one alternative embodiment, one or more software modules may execute after all physical devices are initialized in order to identify physical and/or logical devices and graph their dependencies. For example, a graph management agent may assemble the graph when a first reconfiguration operation is considered.

In an embodiment of the invention, the graph management agent may be implemented as a daemon or other discrete process or module. In another embodiment, it may be implemented within the system kernel, thus allowing it to easily track kernel-level allocations and bindings.

In one embodiment of a resource dependency graph, vertices of the graph represent system resources (e.g., physical, logical and pseudo devices). Edges represent dependencies between resources—from logical to physical or physical to logical, for example. The direction of the dependencies can be reversed as needed. The graph is constructed and can be queried in a distributed, modular fashion.

When a dynamic reconfiguration operation is contemplated, the scope of the operation can be determined by querying the graph regarding dependencies associated with a resource affected by the operation. In response to the query, all dependencies extending from the resource may be identified, in the form of a sub-graph, list or other structure or form.

In an embodiment of the invention, policies and/or constraints may be specified regarding whether a dependency or resource can be added, removed or reconfigured. For example, a policy may specify that a particular physical or logical resource must always have a specified number of dependencies (e.g., to ensure a minimum number of access paths). An illustrative constraint may specify that a particular resource cannot be added or removed to/from a given domain of resources.

Using its resource dependency graph, a graph agent can predict the success or failure of a possible dynamic reconfiguration operation by examining the effect(s) the operation would have upon the graph and comparing those effects to any policies or constraints. Further, the optimal manner in which one or more domains could or should be configured may be determined by considering the information reflected in the graph and, possibly, information external to the graph—such as projected workload, system performance characteristics, etc. Such information may, of course, be stored within the graph.

In one embodiment of the invention, a resource dependency graph may represent resource dependencies within a single resource domain. In other embodiments of the invention, a resource dependency graph may represent resource dependencies in multiple domains. For example, if multiple domains are configured to provide one service (e.g., web service, application service) or perform one task, one resource dependency graph may be generated and maintained to reflect resource dependencies in all the domains. For example, a given service may span multiple platforms or domains (e.g., across a network), and may be managed similar to the manner in which a single platform or domain is managed. In this case, each separate platform or domain may also have a graph for its own dependencies.

Embodiments of the invention described herein may be used to facilitate the automated management of system resources. In particular, an accurate resource dependency graph generated and maintained as described herein may be used to automatically determine the effect of a dynamic reconfiguration operation, predict whether the operation would be successful, and then execute the operation. Thus, an exemplary embodiment of the invention may be implemented to perform automated load balancing of resources within and/or among platforms, domains, services or other entities.

A Resource Dependency Graph

Figure 1:
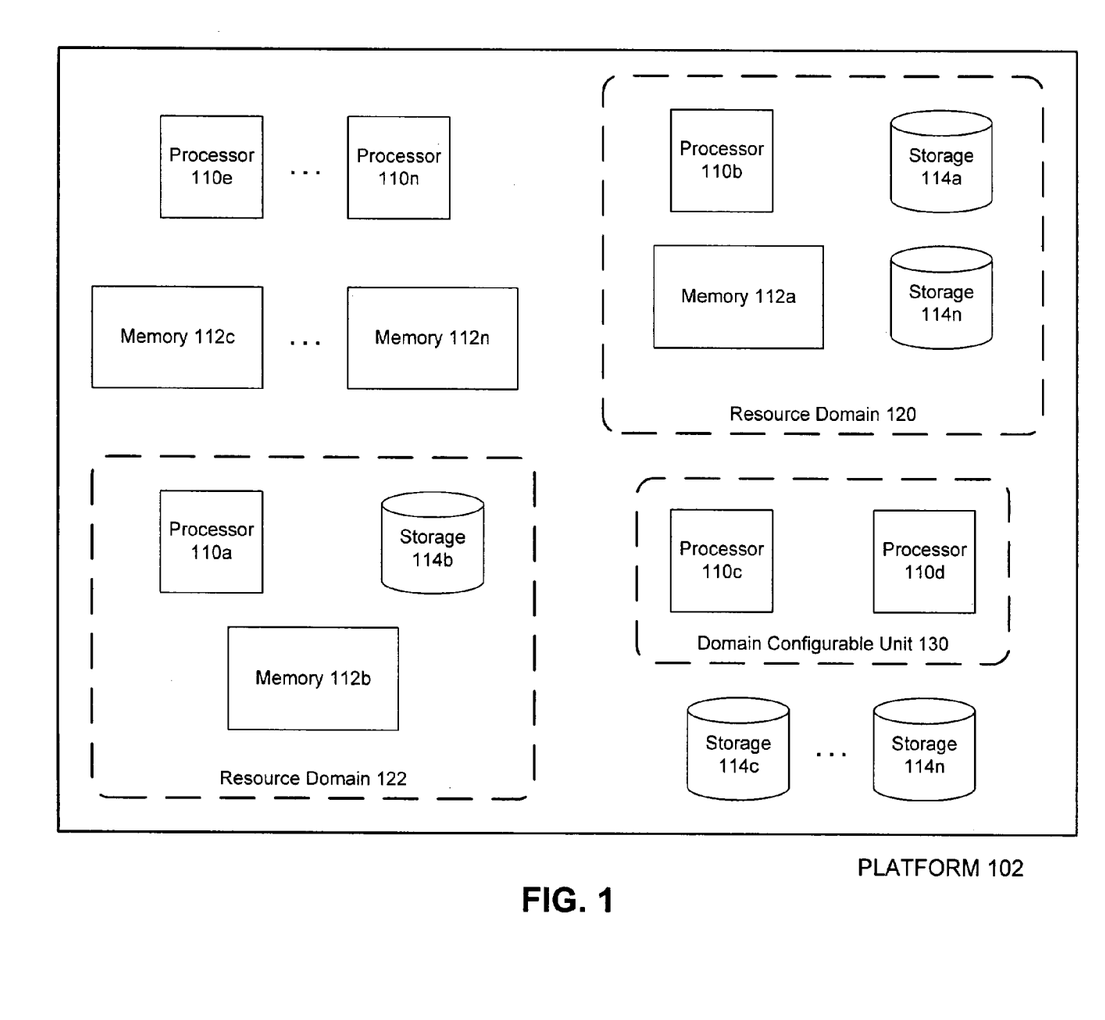
FIG. 1 is a block diagram depicting a platform of computer resources and multiple resource domains, according to one embodiment of the present invention.

FIG. 1 demonstrates a collection of computer system resources that may be dynamically configured or reconfigured using a resource dependency graph, according to one embodiment of the invention.

In this embodiment, platform 102 is an enclosure, cabinet or housing comprising resources such as processors 110, memory 112, storage devices 114, etc. Other resources could also be included in the platform, such as input and output devices, communication interfaces, etc.

Also, some or all resources of a platform may be configured as part of a Domain Configurable Unit (DCU), such as DCU 130. Illustratively, a DCU may take the form of a plug-in interface board, card or other module. In an embodiment of the invention, the resources of a DCU may be allocated, de-allocated or re-allocated together during a dynamic reconfiguration operation.

From the resources of platform 102, one or more resource domains may be configured or defined. Thus, domain 120 comprises a first grouping of processors, memory and storage devices, while domain 122 comprises a second grouping of resources. When assigned to a domain, a resource may be logically and/or electrically isolated from resources in other domains (e.g., with separate power supplies). There may also be some communication isolation applied between domains, although resources may communicate across domain boundaries. For example, domains may be constructed from a switched network of resources, and the switches may be configured to allow or prevent communication across domain boundaries (e.g., for security).

When a physical resource is allocated to a domain, it constitutes a physical allocation of the resource rather than just a virtual allocation. Although this may increase the transition costs involved with a dynamic reconfiguration operation, it avoids any need for an additional layer of software designed to determine whether a resource may be used by a particular entity, which may be required in a system that does not provide physical isolation of resources.

Illustratively, each domain may be host to one instance of an operating system (e.g., Solaris by Sun Microsystems, Inc.) or application (e.g., a database management system), or may be configured to provide a particular service.

In the absence of policies or constraints to the contrary, virtually any resource may be assigned to any domain. However, resources need not always be allocated or assigned to an active domain. Some resources may be unallocated, unconfigured or held in reserve, such as processors 110e–110n and storage devices 114c–114n.

In the illustrated embodiment of the invention, each domain in which a resource of platform 102 participates is composed only of resources within platform 102. However, in alternative embodiments of the invention, a resource within platform 102 may be placed within a domain (or set of domains) that includes resources from one or more platforms or other entities external to platform 102.

Each of domains 120, 122 may be assigned or dedicated to a particular task or service (e.g., as a web server, data server, application server), or may handle a variety of tasks. More than one domain may be assigned to the same service(s) or task(s). As the workload of a domain increases or decreases, it may become necessary or advisable to allocate additional resources to the domain (from another domain) or remove resources from the domain. When a resource is removed from a domain, it may be allocated to another domain or left unallocated (e.g., free resources may be powered down to conserve energy or avoid operating costs). Thus, dynamic reconfiguration of resources may be performed to meet the demands placed on different resource domains.

In one embodiment of the invention, each resource domain includes a graph process, management agent or other module for assembling, maintaining and using a resource dependency graph. The assembled graph will include a separate node or vertex for some or all of the physical devices assigned to the domain, as well as logical devices built upon the physical devices.

Construction of, and modifications to, the graph may be assisted by software modules or processes that initialize, create, mount, remove or otherwise affect a physical or logical device. Thus, each device or subsystem within a system, or each type of device or subsystem, may have an associated device driver, controller or other software module responsible for configuring the device. These modules interface with the graph management agent to ensure the resource dependency graph is maintained correctly.

Figure 2:
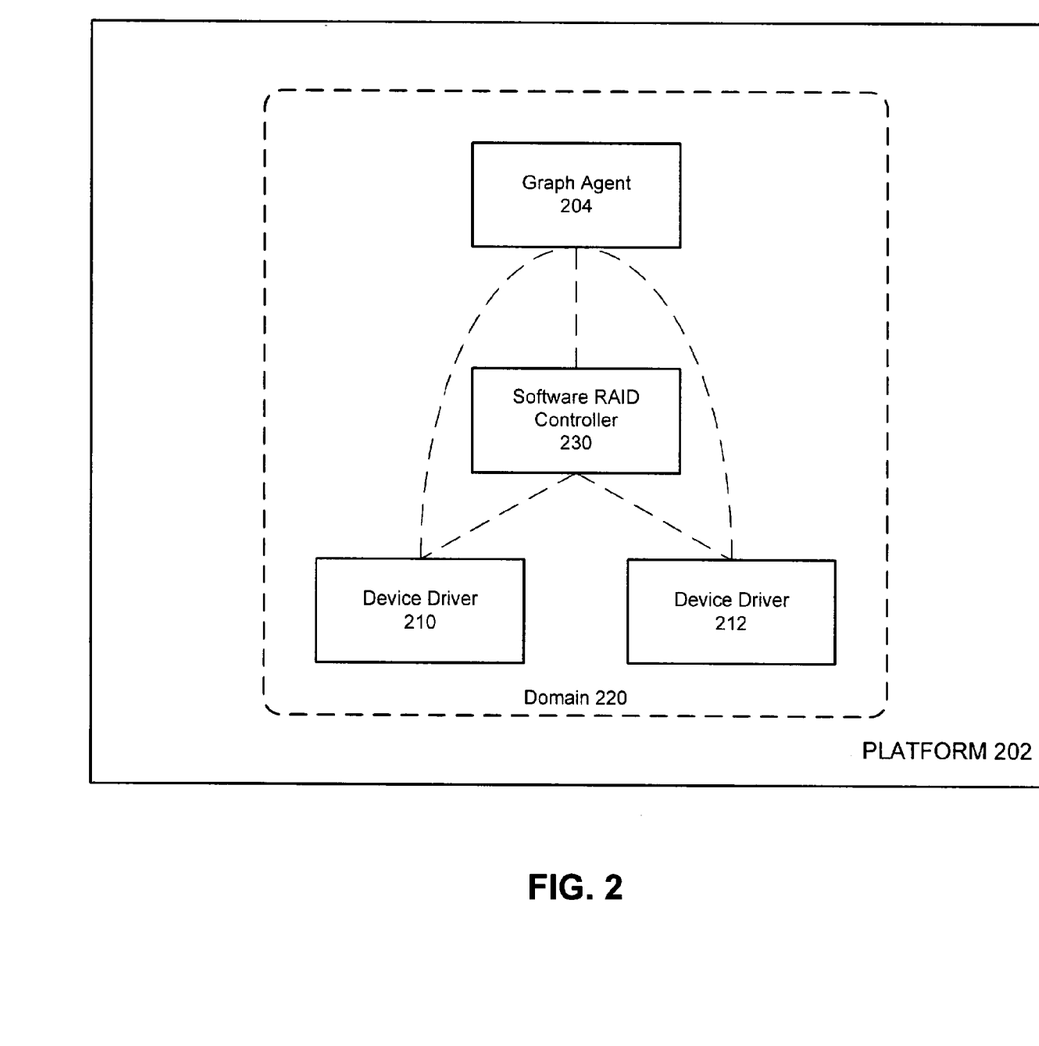
FIG. 2 is a block diagram of software modules of a first domain of a platform of computer resources, according to one embodiment of the invention.

FIG. 2 depicts a set of illustrative software modules for configuring and/or controlling physical and logical resources of a platform, according to one embodiment of the invention. In this embodiment, each resource domain within platform 202 operates a separate instance of an operating system (e.g., Solaris), and therefore, each software module depicted in FIG. 2 may be multiplied by the number of domains defined within platform 202 that have the same device or devices associated with the software module.

In FIG. 2, domain 220 of platform 202 includes graph management agent 204, device drivers 210, 212, and RAID (Redundant Array of Inexpensive Disks) controller 230. Illustratively, device driver 210 controls a first physical storage device or subsystem (e.g., disk0), while device driver 212 controls a second physical storage device or subsystem (e.g., disk1).

Software RAID controller 230 controls operation of a RAID, and may interact with device drivers 210, 212 if they control devices that are part of the RAID. Thus, some software modules are associated with physical devices, while others are associated with logical devices built upon the physical devices. RAID controller 230 may alternatively be a hardware controller.

For each device that is capable of participating in a dynamic reconfiguration operation, a software module (e.g., a device driver, configuration software) is configured to facilitate or perform updates to a resource dependency graph and/or reconfigure the device when necessary. The various software modules may be provided by a manufacturer or vendor of a device or subsystem, or may be modified to provide the necessary functionality.

Each of the software modules associated with a device interfaces with graph agent 204 for the purpose of maintaining and updating the resource dependency graph. In accordance with this embodiment of the invention, each software module, or a routine or procedure provided with the module, is called by graph agent 204 when the resource dependency graph is to be assembled or the software module's device is to be added to the graph. Thus, after the resources of the domain are initialized, the management agent may construct its graph by successively invoking the appropriate software modules for each resource and its dependencies.

In accordance with another embodiment of the invention, each software module calls graph agent 204 when it initializes or creates a device, establishes a new dependency between two (or more) devices, or otherwise affects any device dependencies. For example, when RAID controller 230 creates its associated RAID, it establishes dependencies between the logical RAID and the underlying physical or logical devices, and may call the agent to have those dependencies added to the graph. In turn, graph agent 204 adds the new device or dependency to its resource dependency graph.

Similarly, when a software module removes a device, terminates a dependency between devices, or otherwise affects an existing device dependency, graph agent 204 may be called to update the graph accordingly. A set of programming interfaces may be provided to allow software module designers to interface with the graph agent in a uniform manner.

In the embodiment of the invention depicted in FIG. 2, each domain's resource dependency graph is managed by one graph management agent associated with that domain. In other embodiments of the invention, other agents may operate above the domain level, to manage graphs for multiple domains, a platform, a service, multiple platforms, multiple services, etc. For example, a platform may include a service processor or management workstation configured to operate a platform-level graph agent, or a data center may manage multiple platforms. In yet another embodiment, multiple graph management agents may cooperate to maintain a distributed resource dependency graph.

Figure 3:
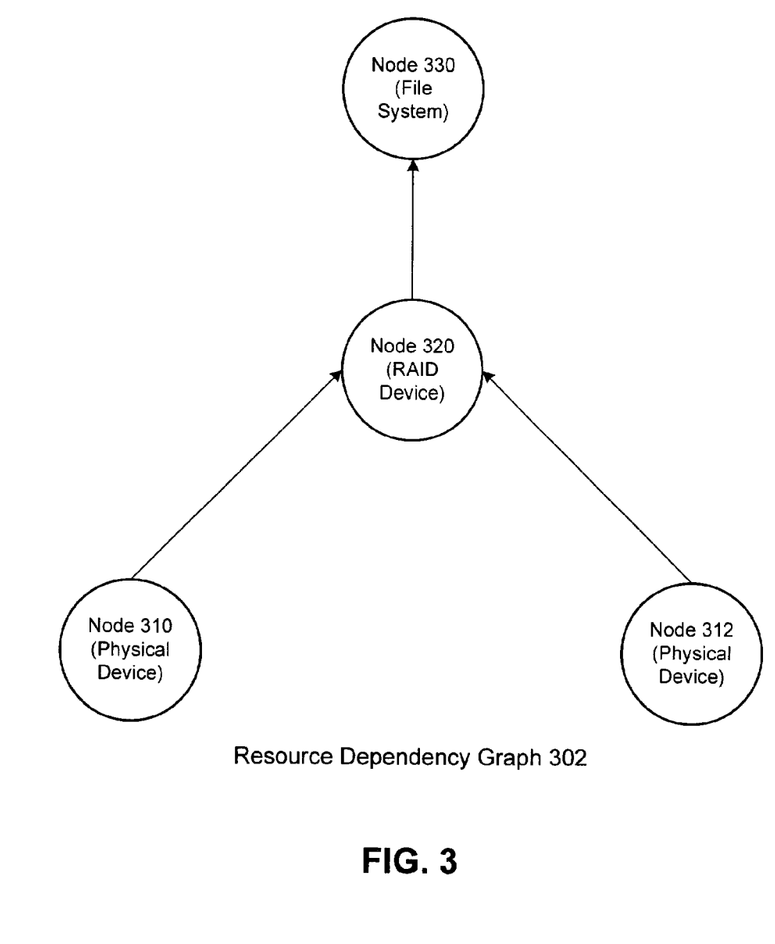
FIG. 3 depicts an illustrative resource dependency graph, according to one embodiment of the present invention.

FIG. 3 demonstrates a simple resource dependency graph for facilitating dynamic reconfiguration operations in one embodiment of the invention. In this embodiment, dependencies are directed from physical devices and lower logical devices toward higher logical constructs. However, the direction of the dependencies can be easily reversed if desired.

In FIG. 3, graph 302 corresponds to the physical and logical devices controlled or represented by the software modules illustrated in FIG. 2. Thus, nodes 310, 312 of graph 302 correspond to storage devices or subsystems managed by device drivers 210, 212. Nodes 310, 312 have dependency links with node 320, which corresponds to a RAID managed by RAID controller 230. The RAID thus comprises the physical and logical devices and constructs controlled by device drivers 210, 212. Node 330 represents a file system built upon the RAID device, which may be created or controlled by RAID controller 230.

In this embodiment, graph 302 corresponds to one resource domain of a platform. In other embodiments, a resource dependency graph may correspond to multiple domains and/or span multiple platforms. Thus, graph management agents operating at different levels (e.g., domain, platform) and in different forms (e.g., daemons, as part of a system kernel) may cooperate to maintain a resource dependency graph and facilitate dynamic reconfiguration of associated resources.

The graph of a domain's resources may be made available, or published, to entities within and/or without the domain. Some of those entities (e.g., device drivers or configuration software) may be able to alter dependencies, and hence the graph. Others may simply use the graph to consider possible dynamic reconfiguration options, construct a higher-level graph (e.g., covering multiple domains), etc.

In one embodiment of the invention, only "named devices"—devices having names that are exported to the file system—are included in a resource dependency graph. In other embodiments, a resource dependency graph is not limited to named devices.

Vertices of a resource dependency graph generated herein may have one or more associated attributes. One illustrative attribute is cost (e.g., cost to operate, purchase or lease the corresponding resource). Many other attributes are possible, such as a reliability measure, operating requirements (e.g., power), type of node or device (e.g., processor, disk, file system), name, etc.

As described above, a resource dependency graph may be subject to policies and/or constraints. In one embodiment of the invention, a policy is a guide or rule regarding whether or when a vertex may be added to or removed from a graph. A constraint may express a policy in a form that can be applied by a graph management agent or other module, or otherwise place restrictions on how a dynamic reconfiguration may affect a graph.

For example, a particular vertex or type of vertex may have a minimum (or maximum) in-degree or out-degree. An in-degree indicates how many graph edges lead into a vertex, whereas an out-degree indicates how many graph edges originate from a vertex. Thus, a vertex representing a RAID controller may require a minimum number of underlying physical devices. If the graph is ordered from physical devices toward logical devices, the vertex's in-degree indicates how many physical devices are participating in the RAID. If a dynamic reconfiguration operation would take away one of those devices, the policy described here would indicate whether or not that can be done.

Policies and constraints may be specific to individual resources or vertices, and therefore local to a particular resource domain or resource dependency graph. Or, a policy or constraint may apply globally across one or more domains.

An example security constraint regarding platform 102 of FIG. 1 may specify that storage device 114*a*, a particular input/output interface, or some other resource, may only be assigned to domain 120. A construction constraint may specify that domain 122 must include at least processor 110*a* and memory 112*b*, or that another domain is limited to a particular number or mix of resources.

A cost constraint may require the total cost of resources of a domain to be less than a threshold. A compatibility constraint may require particular resources to always or never be combined or included in a domain. A utilization constraint may specify that resources of a domain should never be utilized more than X%. A power constraint may require the total power consumption of a domain to be less than a threshold, which may change (e.g., during rolling blackouts). Other types of constraints may also be imposed. In particular, two or more separate constraints may be combined.

Constraints applicable to individual devices or resources may be identified or specified by a software module associated with the resource (e.g., device driver, controller). As described above, this same module may also provide a sub-portion of a resource dependency graph for its resource, as well as methods or routines for adding or removing the resource to or from a domain's graph.

Figure 4:
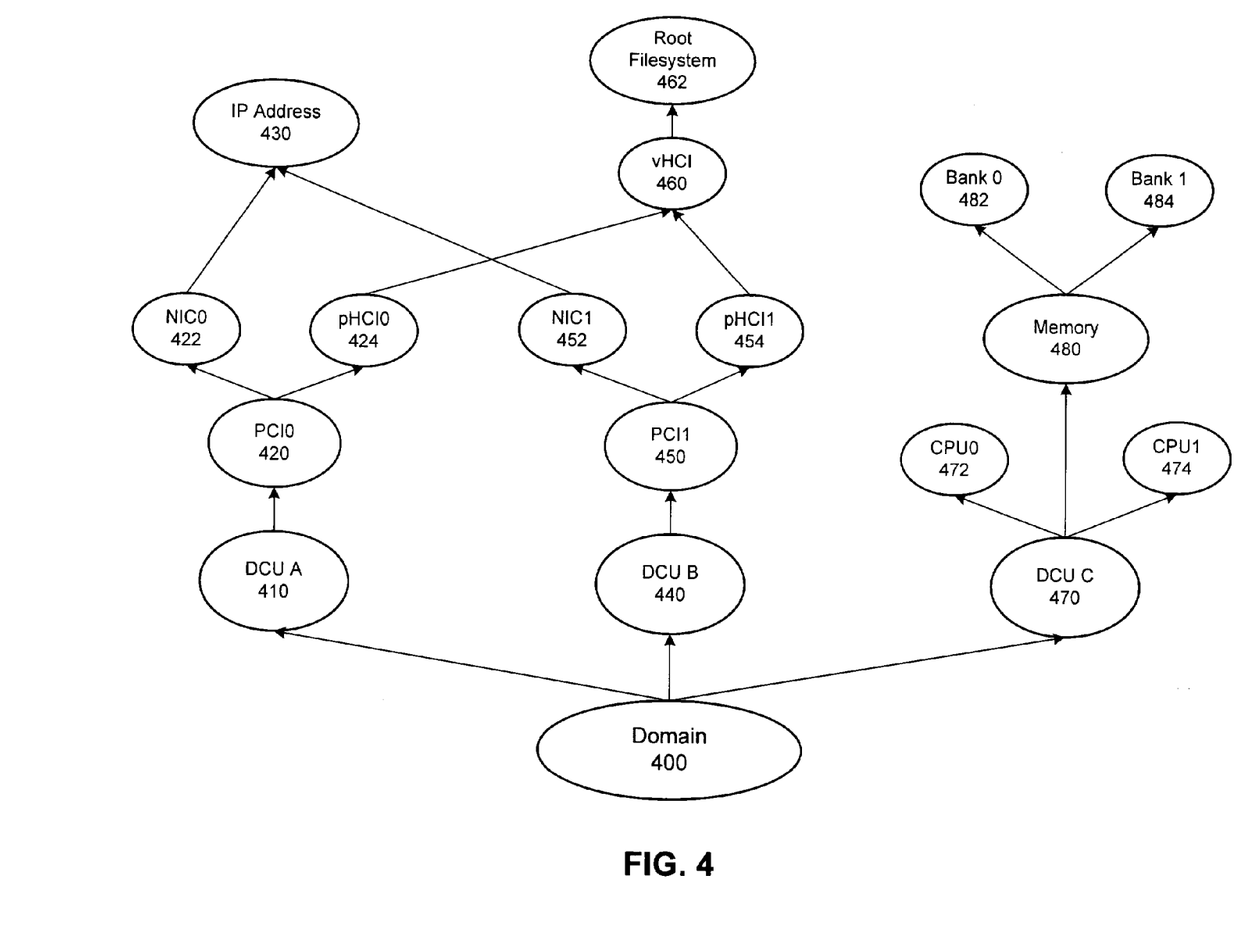
FIG. 4 depicts a more complex resource dependency graph, in accordance with another embodiment of the present invention.

FIG. 4 demonstrates a more complex directed resource dependency graph, according to an embodiment of the invention. As shown in FIG. 4, in domain 400, physical resources are provided in the form of Domain Configurable Units (DCU), which may comprise circuit boards, daughterboards or other hardware modules or units. DCU A (represented by node 410) comprises a first PCI (Peripheral Component Interconnect) communication interface (node 420). DCU B (node 440) comprises a second PCI communication board (node 450). DCU C (node 470) comprises two processors (nodes 472 and 474) and some memory (node 480). The memory corresponding to node 480 is a logical composition of two physical memory banks—bank 0 (node 482) and bank 1 (node 484).

Each of the PCI boards includes a Network Interface Card (NIC) or communication adapter (nodes 422 and 452) and a physical Host Controller Interface (HCI) (nodes 424 and 454). The physical HCIs cooperate to form a multi-pathed virtual HCI (node 460), on which a file system (node 462) is mounted. The NICs support a logical network (e.g., Internet Protocol or IP) address (node 430).

As shown in FIG. 4, a top-level node or vertex of a graph may correspond to a program, file system, service or other consumer of a logical, physical or pseudo device. A program or other entity that binds to a particular resource may need to interface with a graph management agent or similar entity, or support an interface provided with an embodiment of the invention, in order to ensure that a resource dependency graph including that resource will reflect the binding.

In general, a resource dependency graph, such as the graph of FIG. 4, includes a set E of edges (E=$e_1, e_2, \ldots, e_j$) and a set V of vertices (V=$v_1, v_2, \ldots, v_k$), and may be represented as G=(V, E). In one embodiment of the invention, the graph may be a hypergraph, in which edges are hyperedges and connect more than two vertices.

In the resource dependency graph of FIG. 4, an operative policy may restrict dynamic reconfigurations involving multi-pathed devices (e.g., IP Address 430, vHCI 460). Such policies may be expressed, using $d_{in}$ to represent the in-degree of a vertex and $d_{out}$ to represent the out-degree of a vertex, as constraints in the form:

$d_{in}$(IP Address 430)$\geq 1$ and $d_{in}$(vHCI 460)$\geq 1$

The resource dependency graph for domain 400 in FIG. 4 may be generated piece-by-piece as each device is initialized or created. For example, each device's driver or configuration software may identify its device(s) and/or a device's dependencies to a graph management agent so that the graph can be constructed nearly in real-time. And, as resources are deactivated or removed from the domain, the agent may be called to update the graph accordingly. As described above, the management agent may be implemented within the system kernel.

Alternatively, the devices and dependencies may be created (and removed) normally, but the associated software modules (e.g., drivers) may publish information regarding devices and/or dependencies for use by the graph management agent. For example, when a first dynamic reconfiguration process is considered, if the graph has not yet been constructed, the graph agent may draw upon the information to assemble the graph. Alternatively, modules associated with the devices in FIG. 4 may publish interfaces, routines or procedures for the management agent. Illustratively, one routine or procedure may be called to update the graph for a particular device, another routine may remove the device from the graph, another routine may be called to find dependencies of the device, etc.

As yet another alternative, a graph management agent may poll software modules to learn of their devices and/or dependencies.

After a resource dependency graph is assembled, a possible dynamic reconfiguration operation may be considered. To predict whether the operation would be successful, the graph is traversed (starting with a vertex to be reconfigured) and, if any constraints would have to be violated in order to execute the operation, the operation is considered invalid and is not attempted.

For example, in the graph of domain 400 in FIG. 4, an illustrative dynamic reconfiguration operation may be to remove DCU B (node 440). Testing this operation includes performing the following steps (e.g., on a copy of the graph):

Visit node 400;
Remove the edge between nodes 400 and 440;
Visit node 440;
  If no edges support this node, remove the node and the edges
    originating at the node, and visit each child of the node;
  Else, done.

Each node descending from node 440 would be visited in turn.

In an embodiment of the invention in which a system kernel includes a graph management agent, a resource dependency graph may be used directly to synchronize dynamic reconfiguration. In particular, as the graph is traversed during a reconfiguration operation, each node's corresponding resource(s) could be selectively locked by the kernel to prevent further resource allocation until the operation completes.

Figure 5:
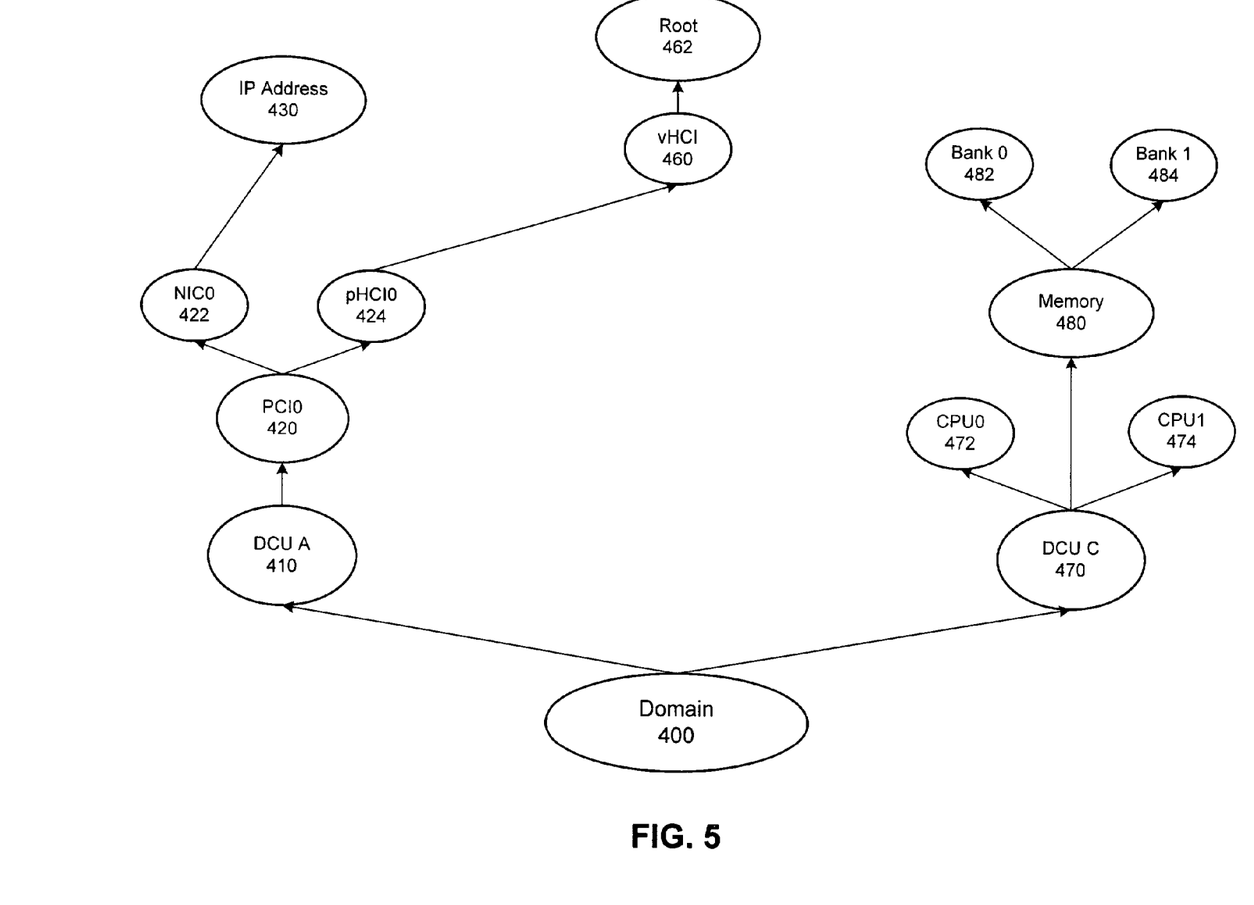
FIG. 5 depicts the resource dependency graph of FIG. 4 as it may appear after an illustrative dynamic reconfiguration operation.

FIG. 5 depicts the resource dependency graph that would result from removing node 440 from the graph of FIG. 4. Because DCU B could be removed without violating either of the constraints, the dynamic reconfiguration operation is legal and would likely succeed, and could therefore be executed.

Figure 6:
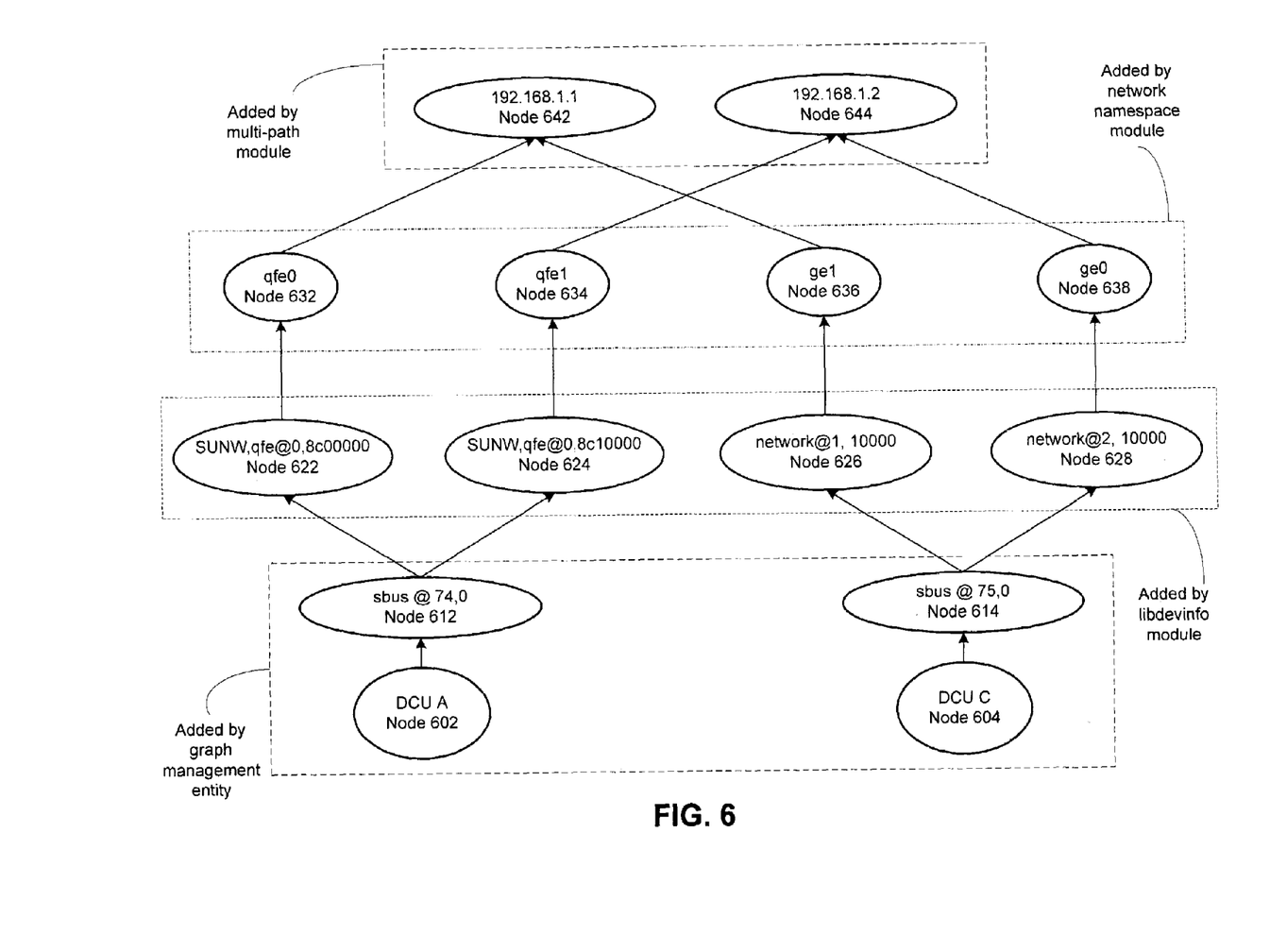
FIG. 6 depicts the construction of a resource dependency graph according to one embodiment of the invention.

FIG. 6 demonstrates the construction of a resource dependency graph in one embodiment of the invention. Portions of the graph representing the various physical and logical resources are added by a graph management agent/entity and/or program modules associated with the resources. A domain represented in FIG. 6 includes two domain configurable units, each of which comprises a communication interface.

The graph is started by the graph management agent, which creates node 602 to represent DCU A and node 604 to represent DCU C. The graph agent also adds node 612 and node 614 to represent the separate communication buses provided by the DCUs. Thus, the graph agent generates a portion of the graph that maps the DCUs to their physical interfaces.

A different program module (e.g., a libdevinfo plugin) generates, or informs the graph management agent how to generate, a portion of the graph for a device tree based on the DCU interfaces. This module may provide nodes 622, 624, 626 and 628, which represent the physical names of communication devices for accessing the DCU interfaces.

A network namespace module, or other program module, contributes a portion of the graph mapping physical device names (i.e., nodes 622–628) to standard logical names represented by nodes 632, 634, 636 and 638. Thus, qfe0, qfe1, ge0 and ge1 may represent different network or communication adapters.

Finally, a multi-path module or other program module maps the communication (e.g., network) names to network addresses. Thus, nodes 642 and 644 represent network addresses, each of which is multi-pathed to the two DCUs.

Each of the program modules described above may contribute its sub-graph to the graph management agent, which assembles the resource dependency graph. Each module may explicitly identify its devices and their dependencies, or may just identify the dependencies (as graph edges), thereby implicitly identifying the nodes or vertices.

For example, the dependency between vertex 632 and vertex 642 may be represented as an edge in the form (qfe0, 192.168.1.1) or (node 632, node 642). From this dependency, the graph agent knows that vertices must be included in the graph for the qfe0 device and the 192.168.1.1 network address.

In one embodiment of the invention, each program module may provide its sub-graph (e.g., as a set of dependencies) in parallel with the other modules. In another embodiment, each module assembles its sub-graph separately, and the graph agent merges them.

Other than vertices representing resources of a resource domain, a resource dependency graph may also include one or more entry or exit vertices. Such nodes provide convenient points for beginning or ending a traversal of the graph. Illustratively, a vertex representing a DCU may act as an entry or exit node. Or, an entry vertex could be added to the graph and linked (via a graph edge) to a vertex that represents a field replaceable resource (e.g., a network card). An entry node may have an in-degree of zero, while an exit node may have an out-degree of zero.

Further, an entry or exit vertex may define a transition point between domains. For example, an exit node in a resource dependency graph maintained by a management agent of one domain may serve as an entry node into a higher-level graph maintained by a service processor serving that domain and one or more other domains.

In an embodiment of the invention described in a following section, given a set of resource domains, different reconfiguration operations may be considered in the hope of improving an objective function for all or some domains, or services provided by the domains. The objective function may be cost (e.g., dollar cost of purchasing, leasing or operating a resource), throughput, response time, etc. Different objective functions may be applicable in different domains or at different times within a given domain.

In one implementation of this embodiment, a platform or service level management agent or process responsible for multiple domains may iteratively consider different dynamic reconfiguration operations. For example, a platform graph agent may separately consider moving each unbound or unallocated resource to different domains, and determine the effect of the operation on that domain's objective function. Thresholds may be specified to indicate a minimum level of improvement that must be expected before an operation is actually executed. Or, the best reconfiguration operation for a particular resource, or the best operation that can be found in a given amount of time, may be executed. Operations that would violate a policy or constraint are invalid and are not executed.

One Embodiment of a Dynamic Resource Reconfiguration System

In an embodiment of the invention configured for a Unix operating system environment (e.g., Solaris™), each process that uses or controls a resource may be required to register itself in a central directory (e.g., /var/<reg>/), wherein each such process may create its own directory (e.g., /var/reg/<pid>/).

A door server (e.g., _consumer_door) for each process may be created during process initialization. The door server may be configured to perform a number of operations, including any or all of the following:

list: return a list of resources currently used by the process;

lock: prevent the process from acquiring another resource (i.e., new resource requests are blocked until unlock is called);

unlock: allows the process to acquire new resources;

filter: allow a locked process to request a resource if the system is not in the process of removing the resource;

renegotiate: attempt to renegotiate the contract for a resource currently in use.

The door server may maintain the process' resource utilization state and answer requests for resource utilization (e.g., from a graph management agent). And, the system may monitor libc calls to obtain resources; therefore, a thread initiated by libc may also maintain the process' resource utilization state. The resource utilization state of a process may be exported by mmap( )-ing the appropriate data structures (e.g., to /var/reg/<pid>/state).

Other system calls that may be monitored or intercepted include: open( ), close( ), exit( ), bind( ), dup( ), pipe( ), fork( ) and exec( ).

In this embodiment of the invention, a graph management agent or daemon may simulate an in-kernel registry by exploiting the invention stored in /var/reg/. The agent should therefore have the same resource utilization knowledge as the kernel.

As described in the preceding section, the graph management agent may maintain a resource dependency graph to monitor and track resource dependencies. In this embodiment, the graph may contain information usually available through /dev and /devices, and possibly information from /proc (e.g., registrations provided by the door server).

Incremental changes in a process may be communicated to the agent, which should be able to be restarted without losing state. During a restart, the entire state of the dynamic resource reconfiguration system can be determined by exploring /var/reg/.

Layered software (e.g., SUNW_network, SUNW_os SUNW_cpu, SUNW_mem, SUNW_ip) may interface with a graph management agent via a plugin mechanism for translators. A translator may, however, be limited to generating nodes and/or edges in the resource dependency graph. Thus, the SUNW_network namespace may be constructed by mapping network adapters in/dev to interface names (e.g., hme0, qfe2). The SUNW_ip namespace can then be built on top of the SUNW_network namespace by establishing the corresponding dependencies between interface names and the IP addresses they support. Also, translator modules may be required to map into either the DDI (Device Driver Interface) or a separate framework for layered software.

In the presently described embodiment of the invention, resources and/or resource subsystems may interpose constraints or policies in the form of scripts or other instructions or code. For example, an IPMP (Internet Protocol Multi-Pathing) module or process may specify that no dynamic reconfiguration operation is permitted to cause a given IP address to be supported by fewer than two network adapters. More particularly, the module may dictate that the in-degree to the IP address' node in the graph must be $\geq 2$. Proposed reconfiguration operations that violate this constraint would be rejected.

Dynamic reconfiguration operations in this embodiment may comprise the removal of a sub-graph from a resource dependency graph and/or the creation of a new graph or sub-graph.

A request to remove a sub-graph or resource—a detach or unbind operation—starts with the identification and location (in the resource dependency graph) of a particular node (e.g., representing the resource to be removed). The scope of the removal operation is determined by recursively exploring each out-bound or in-bound edge from the node, depending on whether dependencies are directed from physical to logical or vice-versa.

Then, with the entire graph locked, each node involved in the removal request is marked to indicate that it is part of an in-progress reconfiguration operation. The graph can then be unlocked to allow resources corresponding to unmarked nodes to be allocated, while resources corresponding to marked nodes are blocked until the operation completes or fails.

A request to add a sub-graph or resource—an attach or bind operation —starts with creation of a corresponding node. Edges from the node are then constructed as appropriate.

In this embodiment, a resource dependency graph may be stored in any suitable form. For example, the graph may be stored as a free-form graph, in which graph edges are stored as pointers to data structures representing the vertices. Or, an adjacency matrix may be used to enumerate the connections within the graph. As another option, the graph may be stored as an adjacency list.

Facilitating Dynamic Reconfiguration with a Perceptron

In an embodiment of the invention, an iterative solver automatically generates or identifies possible reconfigurations of computer resources. A perceptron (e.g., a perceptron neural network) is employed to determine which, if any of those reconfigurations will improve the overall collection of resources, as measured by an objective function. Further, the perceptron may also indicate the extent to which the object function is affected (either negatively or positively) by a possible reconfiguration of the resources.

Illustrative objective functions include cost (e.g., to lower the overall cost of operating the resources), performance (e.g., to increase the overall performance or utilization of the resources), throughput and resource utilization. In an embodiment of the invention, dynamic reconfiguration decisions may be designed to optimize one objective function (e.g., cost) while using another objective (e.g., performance) as a constraint when selecting dynamic reconfiguration operations. For example, dynamic reconfigurations can be examined to minimize cost, while requiring a minimum level of performance or utilization of one or more resources.

In an embodiment of the invention, the set(s) of resources contemplated by the iterative solver and/or the perceptron may span resources from any number of physical cabinets (e.g., platforms) or locations. As described above, the resources may be allocated to domains, wherein each domain is associated with one instance of an operating system (e.g., Solaris by Sun Microsystems, Inc.).

However, different domains may be assigned to support different services (e.g., provide an application service, host a web service). Thus, the resources considered by the iterative solver and the perceptron may not only be distributed across multiple physical boundaries or locations, but also across multiple logical boundaries (e.g., domains, services, operating system instances, Solaris® Resource Manager Resource Pools).

An implementation of this embodiment of the invention therefore might be used to load-balance resources among different services, domains or other logical groupings. Or, entire domains or other groups of resources may be allocated and reallocated among services or other higher-level groupings. The term "container" may be used herein to refer to a group of physical and/or logical resources, and may encompass domains, platforms, services, operating system instances and/or other groupings.

A resource dependency graph described in a previous section may be used to represent the resources allocated to a container (e.g., within one domain or platform). However, such a graph may be extended to cover multiple domains, platforms or other containers.

In an embodiment of the invention, a partitioner is provided to facilitate or manage the dynamic reconfiguration of resources from multiple domains and/or platforms. In this embodiment, a partitioner is comparable to a graph management agent (described above), which operates within a domain. The partitioner may execute on a partitioner node (e.g., management workstation, service processor, system service processor, system controller) separate from the resources it works with, or may be colocated with such resources. For example, the partitioner may operate on a computer system that also executes one or more graph management agents.

In one embodiment of the invention, the partitioner's task of identifying a new resource configuration from an existing or random configuration is divided into two processes. First, the iterative solver identifies one or more possible configurations or reconfigurations of a set of resources. The iterative solver may, for example, identify some or all legal configurations. In this embodiment, a legal reconfiguration is one in which at least one resource is altered (e.g., allocated to, or deallocated from, a container) without violating any constraints. Various types of constraints are described above. A constraint, such as a particular level of performance or utilization, or a resource cost, may be predicted.

In the second process, the perceptron is fed a possible reconfiguration identified by the iterative solver. The perceptron is also provided the current system state and may be given recent past system states as well. The output of the perceptron is an indication as to whether (and, possibly, how much) the new configuration would improve the operative object function, in relation to the previous configuration.

For example, a resource dependency graph described in a previous section may be input to the partitioner. The resource dependency graph identifies all dependencies between the logical and physical resources under the partitioner's purview. The partitioner identifies some or all possible ways in which the resources may be logically divided (e.g., into different containers) without violating any constraints on the system or the resources. The partitioner also determines which of the possible configurations would yield the "best" value under the operative objective function (e.g., lowest cost, highest performance), or at least a better value than the existing configuration.

A dynamic reconfiguration operation to reconfigure the resources into the configuration selected by the partitioner may then be performed. The reconfiguration may be performed manually (e.g., by a system operator) or automatically (e.g., by the partitioner).

The partitioner may execute the iterative solver and/or perceptron continuously, to continually attempt to identify more efficient or effective configurations of its resources. Or, the partitioner may operate intermittently (e.g., with a specified periodicity).

In an illustrative embodiment of the invention, a perceptron can be defined as a neural network comprising one or more artificial neurons. Each neuron has one or more data inputs, a weight assigned to each input, a bias input and an output. The inputs may be presented to the perceptron as a vector; the input weights may be defined as another vector. A neuron calculates the sum of its bias plus the products of each input with their associated weights. In this embodiment, the output of a neuron is between −1 and 1, and is scaled to reflect the objective function, using an appropriate scale. The weights and biases are adjusted during a training period prior to actual run-time operation of the perceptron.

The perceptron may be trained in a way known to those of ordinary skill in the art. For example, the training may be done online or offline. If done online, the system tunes its performance based on its own past performance. If done offline, a perceptron may be trained using a typical workload. Multiple perceptrons may be implemented in a single system, with any desired mix of training methods.

In one embodiment, the perceptron is trained by being exposed to live or recorded data regarding the system's resources. For example, past configurations of the resources (e.g., resource dependency graphs representing previous configurations) may be fed to the perceptron as input. Perceptron weights and biases are then adjusted depending on the perceptron's response to the input and the actual system performance during those configurations. This trains the perceptron to determine system performance from the configuration of the system's resources.

During operation, the input to the perceptron comprises a possible reconfiguration of the resources (e.g., a resource dependency graph). The output is an indication of the performance of the system that could be expected if the new configuration were to be implemented.

More particularly, in one embodiment, the input vector (X) to a perceptron includes the current resource configuration, a proposed reconfiguration of the resources and some performance vector indicating how the system has performed over a small, fixed period of time. The performance vector may, for example, comprise multiple sub-vectors reflecting system statistics sampled a number of times (e.g., 100) in a short time period (e.g., one minute). The input is conditioned or normalized as necessary.

Figure 7:
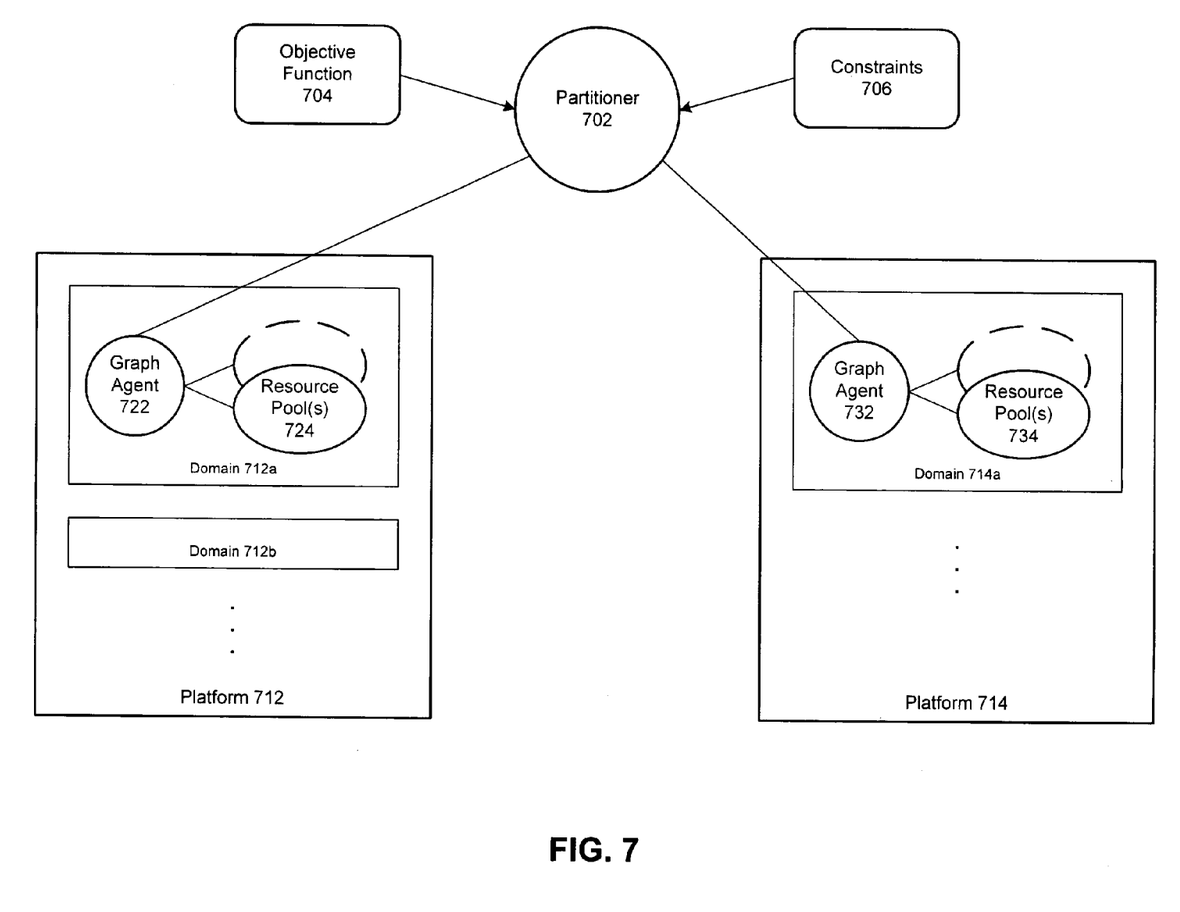
FIG. 7 demonstrates a partitioner for facilitating the dynamic reconfiguration of computer system resources from multiple platforms, according to one embodiment of the invention.

FIG. 7 demonstrates a dynamic resource configuration system configured to manage resources of multiple partitions or containers (e.g., platforms, domains, services) using a perceptron, according to one embodiment of the invention.

In this embodiment, partitioner 702 receives an objective function 704 that is to be promoted through reconfiguration of various system resources. The partitioner may also receive any number of constraints 706 that may restrict how the resources may be configured.

Partitioner 702 may manage resources of any number of domains, platforms, services or other containers. The system of FIG. 7 includes platforms 712, 714, each of which includes one or more domains. An illustrative domain, such as domain 712a of platform 712, includes a graph agent 722 and one or more resource pools 724, DCUs or other sets of resources. Similarly, domain 714a of platform 714 includes graph agent 732 and any number of resource pools 734 and/or other sets of resources. A platform may also include unallocated resources (not shown in FIG. 7), which are not allocated to any domain.

Each domain's graph agent communicates with partitioner 702 to identify new resource availabilities and allocations, resource failures, and so on. When a resource reconfiguration is executed, partitioner 702 may be responsible for instructing a graph agent to take the necessary action to remove or add a resource to its domain.

Figure 8:
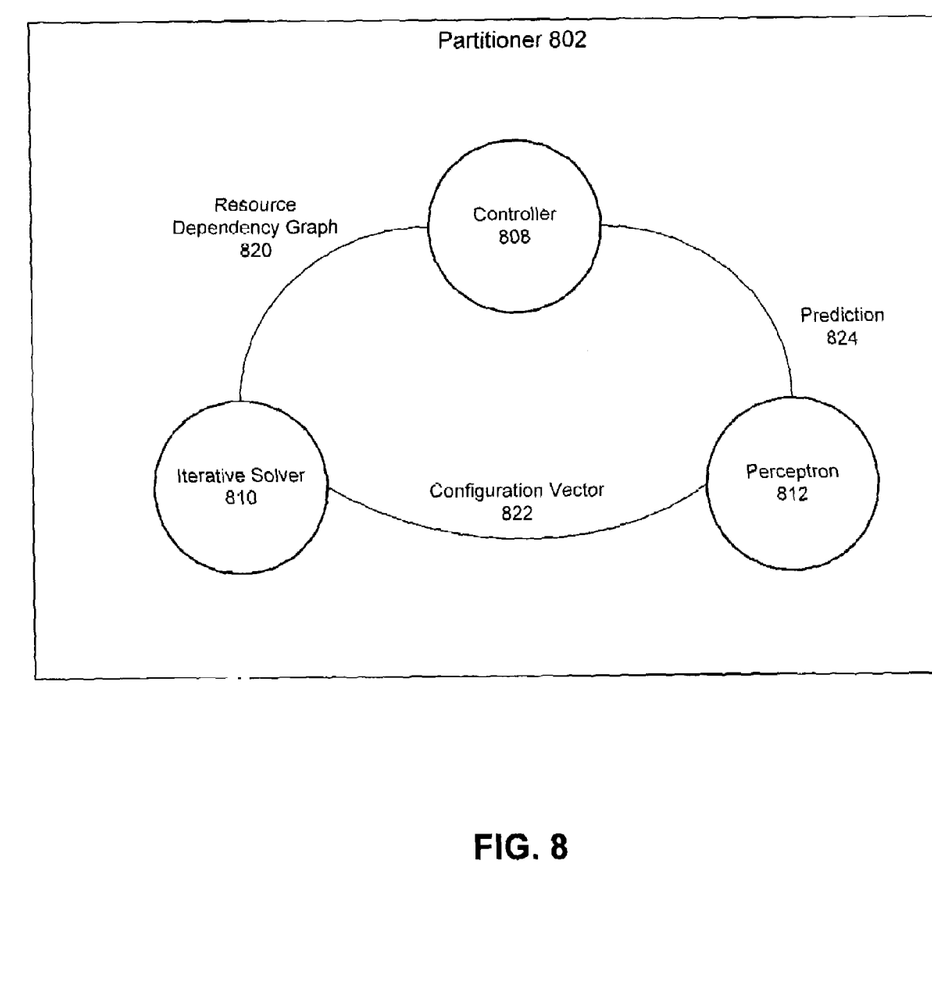
FIG. 8 is a block diagram of a partitioner according to one embodiment of the invention.

FIG. 8 demonstrates a partitioner according to one embodiment of the invention. Partition 802 comprises controller 808, iterative solver 810 and perceptron 812.

As described above, the iterative solver speculatively repartitions or redistributes the resources managed by partitioner 802 among one or more containers. Perceptron 812 then computes the gain or loss that could be expected as a result of that repartition, in terms of the current objective function. Illegal configurations (e.g., configurations that would violate a constraint) are not considered by the perceptron.

Controller 808 initiates the process of finding an attractive new configuration of resources by feeding iterative solver 810 a description 820 of a baseline (e.g., the current) configuration. This information may be in the form of a resource dependency graph.

The iterative solver generates a possible reconfiguration or distribution of resources and sends this information to perceptron 812. The information may be sent in the form of an input vector 822. Perceptron 812 then computes a predicted impact (e.g., prediction 824) of the possible distribution of resources on a predetermined objective function for evaluating the system.

Illustratively, iterative solver 810 may identify every possible legal reconfiguration operation, and perceptron 812 may compute the expected result of every legal operation. The partitioner may then select a reconfiguration that appears to provide the greatest benefit (i.e., the greatest improvement in the objective function). The selected reconfiguration operation may be initiated automatically by the partitioner, or may be submitted for review (e.g., to a human operator) before it is manually or automatically executed.

Because the partitioner is configured to consider all constraints placed on the system and/or individual resources or containers, it can identify conflicting constraints. For example, one constraint may specify that a particular resource must always be excluded from a specified domain, while another constraint may specify that the resource must be included in that domain.

Figure 9:
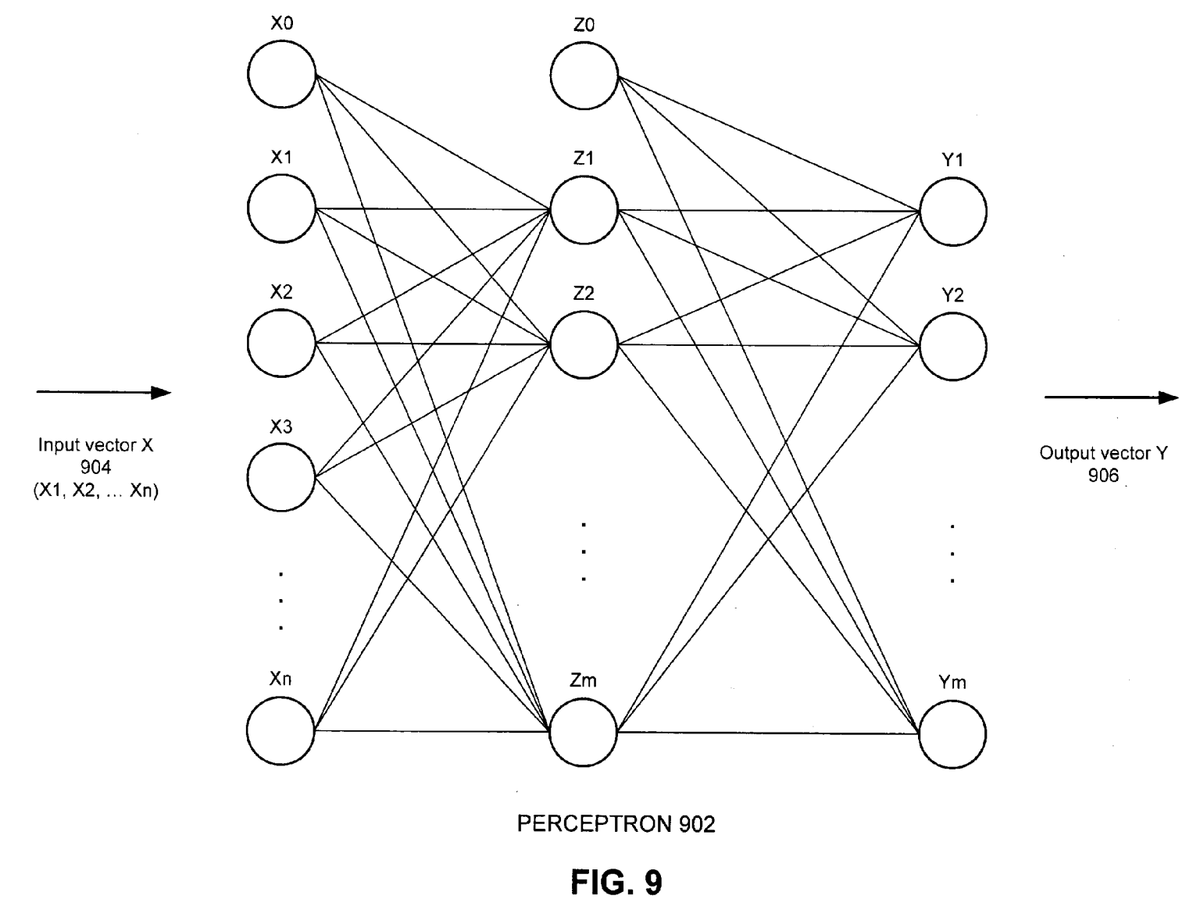
FIG. 9 demonstrates a perceptron for determining the value of a possible reconfiguration of computer system resources in terms of an objective function, according to one embodiment of the invention.

FIG. 9 demonstrates a perceptron configured to predict the impact of a given configuration of computer system resources, according to one embodiment of the invention. Perceptron 902 receives an input vector X (element 904) comprising input values X1, X2, . . . Xn, and produces an output vector or value Y (element 906) comprising values Y1, Y2, . . . Ym.

Perceptron 902 includes three layers of fully connected neurons: input layer X, hidden layer Z and output layer Y. Neurons X0 and Z0 provide bias to the perceptron. In other embodiments of the invention, a perceptron is not limited to the three layers of neurons depicted in FIG. 9. In particular, another perceptron may include multiple hidden layers. Also, the dimensions of the different layers of a perceptron may vary in different embodiments of the invention.

Each neuron in layers X and Z of perceptron 902 has an associated weight or bias. The weights are adjusted during training and/or operation of the perceptron to improve its accuracy.

For example, during training, perceptron 902 may be exposed to random configuration vectors and the weights may be altered to narrow the difference between the corresponding output vectors and the actual performance or status of the resources according to the objective function. Training 902 may comprise a standard back-propagation method of perceptron training using regression. Thus, perceptron 902 may be exposed to random vectors from a training set, and its output may be adjusted as necessary. The training rate, number of hidden layers and the number of neurons in a hidden layer may be adjusted during training (e.g., to increase accuracy).

The foregoing embodiments of the invention have been presented for purposes of illustration and description only.

They are not intended to be exhaustive or to limit the invention to the forms disclosed. Accordingly, the scope of the invention is defined by the appended claims, not the preceding disclosure.

What is claimed is:

1. A method of using a perceptron to facilitate dynamic reconfiguration of computer system resources that include a plurality of physical resources and one or more logical resources constructed upon the physical resources, the method comprising:
  operating a graph module to assemble a resource dependency graph representing a first distribution of the computer system resources among one or more containers configured to comprise resources allocated to tasks, wherein said resource dependency graph comprises:
    vertices representing the computer system resources; and
    edges, wherein each edge represents a dependency between a first physical or logical resource and a second physical or logical resource; and
  executing a partitioner configured to identify a second distribution of the computer system resources among the one or more containers that provides greater value than the first distribution as measured by an objective function for evaluating a configuration of the computer system resources, said partitioner comprising:
    an iterative solver configured to identify one or more possible distributions of the computer system resources different than said first distribution; and
    the perceptron, wherein the perceptron is configured to predict the impact of each of said possible distributions on the objective function; and
  if the perceptron predicts that one or more of said possible distributions would improve the objective function, initiating a reconfiguration of the computer system resources to implement one of the one or more said possible distributions.

2. The method of claim 1, further comprising:
  receiving from the perceptron an indication of whether the objective function would be improved if a given possible distribution was applied.

3. The method of claim 1, further comprising:
  receiving from the perceptron an indication of the extent to which the objective function would be improved if a given possible distribution was applied.

4. The method of claim 1, further comprising:
  receiving from the perceptron an indication of whether the objective function would be maximized if a given possible distribution was applied.

5. The method of claim 1, further comprising:
  applying a given possible distribution if the perceptron predicts that said given possible distribution would improve the objective function.

6. The method of claim 1, wherein the objective function is the cost of operating the set of resources.

7. The method of claim 1, wherein the objective function is the performance of the set of resources.

8. The method of claim 1, wherein the objective function is throughput.

9. The method of claim 1, wherein the objective function is resource utilization.

10. The method of claim 1, further comprising training the perceptron by:
  inputting to the perceptron a previous distribution of the set of resources;
  receiving a corresponding output; and
  adjusting weights of the perceptron based on a difference between the corresponding output and a measure of the objective function at the time of the previous distribution of the set of resources.

11. The method of claim 1, further comprising: for each of the one or more possible distributions, determining whether said distribution would violate any constraints on the resources.

12. The method of claim 11, wherein a constraint comprises a limitation or requirement upon a possible distribution of the computer system resources.

13. The method of claim 12, wherein each said container is one of:
  a domain of resources operating under one instance of an operating system; and a subset of resources operating under multiple instances of one or more operating systems, wherein the subset of resources cooperate to provide a service.

14. The method of claim 1, further comprising: determining which of the one or more possible distributions is optimal.

15. The method of claim 1, wherein the perceptron comprises a neural network including one or more artificial neurons comprising:
  one or more data inputs;
  for each data input, an associated weight; and
  an output.

16. An apparatus for identifying a desirable reconfiguration of computer system resources, comprising:
  one or more platforms comprising physical computer system resources, wherein one or more logical resources may be constructed upon each of the physical resources;
  a graph module configured to facilitate the assembly of a resource dependency graph representing a first configuration of the physical resources and the logical resources, wherein the resource dependency graph comprises:
    vertices representing each of the physical resources and each of the logical resources; and
    edges, wherein each edge represents a dependency between a first physical or logical resource and a second physical or logical resource; and
  a partitioner configured to identify a second configuration of the physical resources and the logical resources providing greater value than the first configuration as measured by an objective function, said partitioner comprising:
    an iterative solver configured to identify a possible configuration of the physical resources and the logical resources different from the first configuration; and
    a perceptron configured to evaluate said possible configuration in terms of the objective function.

17. The apparatus of claim 16, wherein the objective function comprises one of:
  a cost associated with the physical computer system resources; and
  a performance of the physical computer system resources.

18. The apparatus of claim 16, wherein the objective function comprises one of:
  a utilization of physical computer system resources; and
  a throughput of the physical computer system resources.

19. The apparatus of claim 16, wherein said partitioner is further configured to determine whether said possible configuration violates any of a set of constraints placed upon the physical resources and the logical resources.

20. The apparatus of claim 16, wherein said partitioner further comprises:
a controller configured to identify the first configuration of the physical resources and the logical resources to said iterative solver.

21. The apparatus of claim 20, wherein said partitioner identifies the first configuration to said iterative solver by providing the resource dependency graph to said iterative solver.

22. A tangible computer readable storage medium storing instructions that, when executed by a computer, cause the computer to perform a method of using a perceptron to facilitate dynamic reconfiguration of computer system resources that include a plurality of physical resources and one or more logical resources constructed upon the physical resources, the method comprising:

operating a graph module to assemble a resource dependency graph representing a first distribution of the computer system resources among one or more containers configured to comprise resources allocated to tasks, wherein said resource dependency graph comprises:

vertices representing the computer system resources; and edges, wherein each edge represents a dependency between a first physical or logical resource and a second physical or logical resource; and executing a partitioner configured to identify a second distribution of the computer system resources among the one or more containers that provides greater value than the first distribution as measured by an objective function for evaluating a configuration of the computer system resources, said partitioner comprising:

an iterative solver configured to identify one or more possible distributions of the computer system resources different than said first distribution; and the perceptron, wherein the perceptron is configured to predict the impact of each of said possible distributions on the objective function; and if the perceptron predicts that one or more of said possible distributions would improve the objective function, initiating a reconfiguration of the computer system resources to implement one of the one or more said possible distributions.

* * * * *